3,644,285
POLYAROMATIC PYRAZINES
Jerry G. Higgins, Normal, Ill., assignor to Research Corporation, New York, N.Y.
No Drawing. Filed Oct. 12, 1970, Ser. No. 80,154
Int. Cl. C08g 33/02
U.S. Cl. 260—47 R                   7 Claims

ABSTRACT OF THE DISCLOSURE

Polyaromatic pyrazines having high-temperature stability are prepared by the condensation of bis-α-halo-aromatic ketones with ammonia, said polymers having utility in the form of film and fibers.

The solubility of polymeric polyaromatic polyimides is increased by heating with peroxides, preferably in the presence of a strong acid.

---

This invention relates to novel polymeric heterocyclic nitrogen compositions and to a method for the solubilization of such compositions.

Modern technology has created a need for polymeric materials stable for extended periods of time at temperatures upwards of 300° C. As discussed in the paper by Frazer in Scientific American, pp. 96–105 (1969), such materials are required for advanced aircraft, protective clothing, improved insulation, and so forth. Frazer lists several polymer varieties, mainly polyaromatic heterocyclic nitrogen compositions of the polyimide type, as having good thermal stability and useful electrical and mechanical properties. However, except for the polybenzimidazoles, many of these are poorly soluble in conventional solvents and are difficult to fabricate into useful articles.

I have now discovered a new class of polymeric heterocyclic nitrogen compositions having desirable thermal stability. These polymers are made from comparatively readily available monomers and, unlike most prior art polymers of this general type, do not require carefully controlled monomer stoichiometry in their synthesis. I have also discovered a method whereby the solvent solubility of difficultly soluble polymeric polyaromatic polyimides can be increased.

The novel polymeric compositions of the present invention are characterized by the presence of alternating benzenearomatic and pyrazine units, and are further characterized by a high degree of thermal stability and resistance to oxidation at elevated temperatures. These compositions are particularly useful in the preparation of oxidation- and corrosion-resistant articles capable of use at temperatures above 400° C. The polymers of the present invention are generally cast into films or spun into fibers preparatory to fabrication into thermally stable articles. Where these polymers do not exhibit sufficient solubility for facile fabrication, their solvent solubility is increased by peroxide treatment, as will be more fully described below.

More specifically, the present invention in its composition aspect is a polymer consisting essentially of the repeating structural unit:

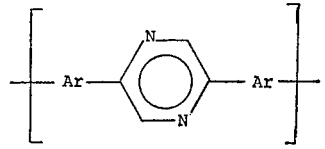

wherein Ar is a benzenearomatic moiety, particularly phenylene or diphenylene, e.g.,

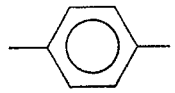

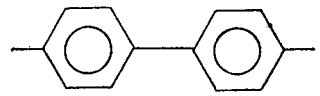

or

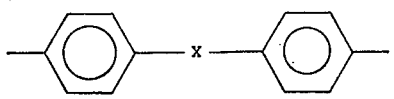

wherein X is $CH_2$, $(CH_2)_2$, O, S or $SO_2$.

In another aspect, the present invention is a method for increasing the solvent solubility of a polymeric polyaromatic polyimide composition which comprises heating the composition with a peroxide, preferably in the presence of a strong acid.

The novel polymeric compositions of the present invention are most conveniently prepared by the condensation of a bis-α-haloaromatic ketone with ammonia. Preferably, the condensation is effected in a refluxing solvent such as dimethylacetamide. The dihydropyrazine intermediates form an orange-red colored solution; the disappearance of this color to a light yellow colored solution is indicative of complete aromatization. Refluxing in the presence of air for two days is usually required to complete aromatization.

My invention is further illustrated by means of the following non-limiting examples:

(A) Preparation of monomers (1) Bis-p-(α-bromoacetyl)benzene.—To 15 g. (0.092 mole) of p-diacetylbenzene in 200 ml. of acetic acid was added dropwise 34 g. (0.19 mole) of bromine. After the bromine addition was complete, the reaction mixture was stirred for 2 hours and the product filtered. The crude product was then dried in vacuo and recrystallized from chloroform to a constant melting point of 172–173° C.

(2) Bis-p-p'-(α-chloroacetyl)biphenyl.—To 31 g. (0.20 mole) of biphenyl in 500 ml. of carbon disulfide were added 80 g. (0.60 mole) of aluminum chloride and 68 g. (0.60 mole) of α-chloroacetyl chloride. The reaction mixture was refluxed for 12 hours, cooled to room temperature, and the carbon disulfide decanted from the thick oil. After hydrolysis in 10% hydrochloric acid, the crude product was filtered, dried in vacuo, and recrystallized from N,N-dimethylformamide to a constant melting point of 224–225° C.

(3) Bis-p,p'-(chloroacetyl)diphenyl ether.—To 34 g. (0.20 mole) of diphenyl ether in 500 ml. of carbon disulfide was added 80 g. (0.60 mole) of aluminum chloride and 68 g. (0.60 mole) of α-chloroacetyl chloride. The reaction mixture was refluxed for two hours, cooled to room temperature, and the carbon disulfide decanted from the thick oil. After hydrolysis in 10% hydrochloric acid, the crude product was filtered, dried in vacuo, and recrystallized from chloroform to a constant melting point of 111–113° C.

(4) Bis-p,p'-(α-chloroacetyl)diphenylmethane.—To 34 g. (0.20 mole) of diphenylmethane in 500 ml. of carbon disulfide were added 80 g. (0.60 mole) of aluminum chloride and 68 g. (0.60 mole) of α-chloroacetyl chloride. The reaction mixture was refluxed for three hours, cooled to room temperature, and the carbon disulfide decanted from the thick oil. After hydrolysis in 10% hydrochloric acid, the crude product was filtered and dried in vacuo. The crude product was purified by repeated recrystallizations from carbon tetrachloride to a constant melting point of 124–125° C.

(5) α,α-Dibenzoyl-α,α'-dibromo-p-xylene.—To 150 ml. of acetic acid were added 11.6 g. (0.037 mole) of α,α'-dibenzoyl-p-xylene, prepared by the method of Wrasidlo et al., J. Polymer Sci., Part A, 7, 281 (1969), and 12.5 g. (0.078 mole) of bromine, dropwise. After spontaneous refluxing had ceased, the product precipitated from solution. The product was filtered and washed several times with water. The yield of crude product was 15 g. (86%). The crude product was recrystallized from carbon tetrachloride and benzene to a constant melting point of 179–180° C.; the yield of purified product was 11 g. (62%).

Calcd. for $C_{22}H_{16}Br_2O_2$ (percent): C, 55.94; H, 3.42; Br, 33.85. Found (percent): C, 55.83; H, 3.21; Br, 34.00.

(B) Preparation of polymers.—The more detailed first example is descriptive of the procedure utilized to prepare the novel polymers of the invention.

(1) Poly-[2,5-(4,4' - oxydiphenylene)pyrazine].—To 150 ml. of purified N,N-dimethylacetamide, saturated with ammonia, was added 2 g. of bis-p,p'-(α-chloroacetyl)diphenyl ether. The reaction was stirred at room temperature for one hour, heated at 50–60° for one hour, and then refluxed for 20 hours in the presence of air. After refluxing for 2–4 hours the polymer began to precipitate from the reaction mixture. After the heating period was complete, the reaction mixture was cooled, poured into 500 ml. water, and filtered. The polymer was dried in vacuo at 200° for 18 hours to give a quantitative yield of product. Its inherent viscosity in formic acid, 0.25 g. of polymer per 100 ml. of solvent at 25° C., was 0.40.

(2) Poly-[2,5-(1,4 - phenylene)pyrazine].—The indicated product was prepared using the procedure of the previous example using bis-p-(α-bromoacetyl)benzene as the bis-α-haloaromatic ketone reactant. It precipitated from the reaction mixture and was completely insoluble in all of the common polymer solvents tried. The polymer was dissolved by heating in 15 ml. of 97% formic acid containing 0.25 ml. of 30% $H_2O_2$; the resultant solubilized polymer had an inherent viscosity, 0.25 g. in 100 ml. of solution at 25° C., of 0.40. The same procedure but using concentrated sulfuric acid gave solubilized polymer having an inherent viscosity of 1.30.

(3) Poly-[2,5-(4,4'-biphenylene)pyrazine].—The indicated product was prepared using the procedure of the previous examples using bis-p,p'-(α-chloroacetyl)biphenyl as the bis-α-haloaromatic ketone reactant. It precipitated from the reaction mixture and was completely insoluble in all of the common polymer solvents tried. The polymer was solubilized by treatment with acid-peroxide as in the previous example. The inherent viscosity of the solubilized polymer, 0.25 g. of polymer in 100 ml. of solution at 25° C., was 0.43 in the $HCO_2H$—$H_2O_2$ solution and 0.35 in the $H_2SO_4$—$H_2O_2$ solution, respectively.

(4) Poly - [2,5 - (4,4' - methylenediphenylene)pyrazine].—The indicated product was prepared using the procedure of the previous examples using bis-p,p'-(α-chloro)diphenylmethane as the bis-α-haloaromatic ketone reactant. Its inherent viscosity, 0.25 g. per 100 ml. of solvent, was 0.37 in formic acid.

(5) Poly-[2,5 - (1,4-phenylene)-3,6-diphenylpyrazine]. The indicated product was prepared using the procedure of the previous examples with α,α'-dibenzoyl-α,α'-dibromo-p-xylene as the bis - α - haloaromatic ketone reactant. The polymer was very soluble in formic, phosphoric, and sulfuric acids, and in dimethylformamide, dimethylacetamide and dimethylsulfoxide. It softened at 270–300° C. and its inherent viscosity in formic acid, 0.25 polymer in 100 ml. of solvent at 25° C., was 0.18.

(6) (7), and (8).—In a similar manner, polymers having —$C_6H_4$—$(CH_2)_2$—$C_6H_4$—, —$C_6H_4$—S—$C_6H_4$— and —$C_6H_4$—$SO_2$—$C_6H_4$ as the recurring benzenearomatic unit were prepared from bis-p,p'-(α-chloroacetyl)-1,2-diphenylethane, bis-p,p'-(chloroacetyl)diphenyl thioether, and bis-p,p'-(chloroacetyl)sulfone.

The normally solvent insoluble polymers of Examples 2 and 3 were quite soluble in formic, phosphoric, and sulfuric acids when a small amount of 30% $H_2O_2$ was added to the hot solvent-polymer mixtures. The polymers were also partially soluble in dimethylformamide and dimethylacetamide after heating in the presence of peroxides. The observed increase in solubility is attributed to the introduction of the polar N-oxide group at various locations along the polymer chain resulting from the peroxide-induced oxidation of imide groups. Infrared spectra for such modified polymers showed a strong absorption band in the 1220–1270 cm.$^{-1}$ region characteristic of (N→O).

Other polymeric heterocyclic nitrogen compositions can be solubilized by N-oxide formation. For example, the solvent solubilities of polyimides such as polybenzimidazoles, polyimidazopyrolones, polybenzothiazoles, polybenzoxazoles, polyoxadiazoles, polyphenyltriazoles, polyquinoxalines, and polythiadiazoles are increased by heating in the presence of peroxides. Various inorganic and organic peroxides may be utilized but hydrogen peroxide is most convenient and is preferred.

The novel polymers of the invention are thermally stable at 400° C. and above both in air and nitrogen atmospheres, as measured by thermogravimetric analysis. None of these polymers melted below 500° C. except that of Example 5 which softened about 270–300° C. but was stable up to 550° in air.

The polymeric pyrazines of the present invention may be fabricated or incorporated into shaped articles wherein their unique stability to elevated temperatures may be effectively utilized. For example, fibers can be formed by injection of a solution of the polymers (further solubilized if necessary by the method of the present invention) into a non-solvent, and woven generally in admixture with other fibers into a heat-resistant fabric. Similarly, the polymers cast in film form may be used to protect other articles from corrosion and other adverse effects accelerated by exposure to elevated temperatures.

Other variations in my invention will suggest themselves to those skilled in the art and my invention is as claimed.

I claim:

1. Film and fiber forming polymers consisting essentially of the recurring structural unit

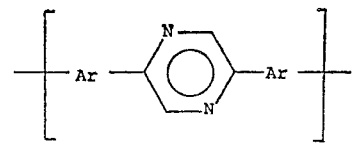

wherein Ar is a benzenearomatic moiety.

2. Polymers according to claim 1 wherein Ar is phenylene or diphenylene.

3. Film and fiber forming poly-[2,5-(4,4'-oxydiphenylene)pyrazine].

4. Film and fiber forming poly-[2,5-(1,4-phenylene)pyrazine].

5. Film and fiber forming poly-[2,5-(4,4'-biphenylene)pyrazine].

6. Film and fiber forming poly-[2,5-(4,4'-methylenediphenylene)pyrazine].

7. Film and fiber forming poly-[2,5-(1,4-phenylene)-3,6-diphenylpyrazine].

References Cited
UNITED STATES PATENTS

| | | | |
|---|---|---|---|
| 3,532,646 | 10/1970 | Antikow et al. | 260—2 |
| 3,563,917 | 2/1971 | Marvel | 260—2 |
| 3,577,387 | 5/1971 | Kersten et al. | 260—47 |

WILLIAM H. SHORT, Primary Examiner

L. L. LEE, Assistant Examiner

U.S. Cl. X.R.

260—2 R, 30.6 R, 30.8 R, 30.8 DS, 31.2 N, 32.6 N, 63 N, 65, 590, 592, 612 R